(12) United States Patent
Wollmershauser et al.

(10) Patent No.: US 8,707,382 B2
(45) Date of Patent: Apr. 22, 2014

(54) SYNCHRONIZING PRESENTATIONS OF MULTIMEDIA PROGRAMS

(75) Inventors: Steven M. Wollmershauser, San Antonio, TX (US); Jason B. Sprague, San Antonio, TX (US); William O. Sprague, Jr., Wimberley, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 560 days.

(21) Appl. No.: 12/030,536

(22) Filed: Feb. 13, 2008

(65) Prior Publication Data

US 2009/0205008 A1  Aug. 13, 2009

(51) Int. Cl.
*H04N 7/173* (2011.01)

(52) U.S. Cl.
USPC .............................. 725/133; 725/141; 725/153

(58) Field of Classification Search
USPC .................. 725/131, 133, 139, 141, 151, 153; 709/208–210
See application file for complete search history.

(56) References Cited

U.S. PATENT DOCUMENTS

| | | | | |
|---|---|---|---|---|
| 5,808,662 | A  * | 9/1998  | Kinney et al. | 348/14.1 |
| 6,233,389 | B1 | 5/2001 | Barton et al. | |
| 6,654,956 | B1 * | 11/2003 | Trinh et al. | 725/100 |
| 2002/0010935 | A1 * | 1/2002 | Sitnik | 725/78 |
| 2003/0002849 | A1 * | 1/2003 | Lord | 386/46 |
| 2003/0095574 | A1 * | 5/2003 | Zimmermann | 370/503 |
| 2004/0003393 | A1 * | 1/2004 | Gutta et al. | 725/25 |
| 2004/0012578 | A1 | 1/2004 | Naegle | |
| 2004/0252726 | A1 | 12/2004 | Matsumoto | |
| 2005/0212970 | A1 | 9/2005 | Joskin | |
| 2005/0251827 | A1 * | 11/2005 | Ellis et al. | 725/47 |
| 2006/0002681 | A1 * | 1/2006 | Spilo et al. | 386/46 |
| 2006/0034581 | A1 | 2/2006 | Konetski et al. | |
| 2006/0161835 | A1 | 7/2006 | Panabaker et al. | |
| 2006/0236352 | A1 * | 10/2006 | Scott, III | 725/89 |
| 2006/0242314 | A1 | 10/2006 | Logvinov et al. | |
| 2006/0271960 | A1 * | 11/2006 | Jacoby et al. | 725/46 |
| 2007/0250901 | A1 * | 10/2007 | McIntire et al. | 725/146 |
| 2007/0283380 | A1 * | 12/2007 | Aoki et al. | 725/32 |
| 2008/0235733 | A1 * | 9/2008 | Heie et al. | 725/46 |

FOREIGN PATENT DOCUMENTS

EP  1715612 A1  10/2006

OTHER PUBLICATIONS

International Search Report, International Patent Application No. PCT/US2009/032978, mailed May 28, 2009, 4 pages.
International Preliminary Report on Patentability and Written Opinion of the International Searching Authority, International Patent Application No. PCT/US2009/032978, issued Aug. 17, 2010, mailed Aug. 26, 2010, 7 pages.

* cited by examiner

*Primary Examiner* — Farzana Hossain
(74) *Attorney, Agent, or Firm* — Jackson Walker L.L.P.

(57) ABSTRACT

Synchronization is provided for set-top boxes that display multiple instances of a single multimedia program. Embodied set-top boxes request the transmission of a multimedia program and determine the play point of a remote set-top box. Embodied set-top boxes set a local play point to correspond to the remote set-top box's play point. More than two set-top boxes may be synchronized in accordance with disclosed embodiments, and some systems implement master and slave set-top boxes for purposes of synchronization.

23 Claims, 5 Drawing Sheets

SYNCHRONIZING PRESENTATIONS OF MULTIMEDIA PROGRAMS

BACKGROUND

1. Field of the Disclosure

The present disclosure generally relates to distribution of multimedia content and more particularly to synchronizing presentations of multimedia programs.

2. Description of the Related Art

Many households and businesses contain televisions that are communicatively coupled to set-top boxes for receiving multimedia programs from provider networks. In some cases, multiple instances of a multimedia program are displayed at a single location. For example, a business may have three televisions simultaneously tuned to a sporting event.

DESCRIPTION OF THE EMBODIMENT(S)

In one aspect, an embodied set-top box is enabled for synchronizing with remote devices such as other set-top boxes. The embodied set-top box includes an input for receiving a frame identification value indicative of a remote play point of a first instance of a multimedia program. The set-top box further includes a controller for aligning a local play point with the remote play point to generate a second instance of the multimedia program that is substantially synchronized with the first instance of the multimedia program. Some embodied set-top boxes further include an output for sending a request to join a broadcast of the multimedia program. Further, embodiments may include a frame identification module for identifying a local play point and may include a demultiplexing module for separating a multimedia stream into at least one audio component and into at least one video component. The multimedia stream includes data for the multimedia program and the local play point corresponds to a frame of the video component that is stored in a video buffer. In other embodiments, the local play point may correspond to a frame of the audio component that is stored in an audio buffer. Embodied set-top boxes may further include a system clock for access by a controller in aligning the local play point with the remote play point. The set-top box may further be enabled for periodically assuring synchronization between the local play point and the remote play point. The frame identification value may be a hash value or may be a sequential identifier, as examples.

In another aspect, an embodied computer program product stored on one or more computer readable mediums is enabled for synchronizing presentation of instances of multimedia programs. Embodied computer program products have instructions for receiving a reference input corresponding to a reference play point of a remote set-top box, for example. Further instructions are for adjusting a local play point to correspond to the reference play point. In some embodiments, further instructions are for storing a multimedia stream in one or more buffers. The reference input may be received over a local network. Further, the reference input may include a remotely generated index value and a remotely generated timestamp. The remotely generated index value and the remotely generated timestamp may be from the remote set-top box and may be for adjusting the local play point. Adjusting the local play point may include comparing the remotely generated index value to a local index value and comparing the remotely generated timestamp to local timestamp. In some embodiments, the reference input corresponding to the reference play point is derived from an audio input from a microphone.

In still another aspect, an embodied method is for frame synchronization when presenting one of a plurality of instances of a multimedia program. Embodied methods include operations for receiving an incoming multimedia stream that includes a plurality of incoming frames. Embodied methods further include buffering a portion of the plurality of incoming frames and receiving a play point from a remote device. Embodied methods further include playing an instance of the multimedia program at the play point of the remote device. Some embodiments include requesting the play point from the remote device. Requesting the play point and receiving the play point may be accomplished over a local network. Embodied methods may further include sending to a provider network a join request to receive the incoming multimedia stream containing the multimedia program. In some embodiments, the method further includes identifying a video frame corresponding to the play point of the remote device. Buffering a portion of the plurality of incoming frames may include buffering a plurality of pointers that index a corresponding plurality of frame loads.

In the following description, details are set forth by way of example to enable one of ordinary skill in the art to practice the claimed subject matter without undue experimentation. It should be apparent to a person of ordinary skill that disclosed embodiments are exemplary and not exhaustive of all possible embodiments. Regarding reference numerals used to describe elements in the figures, a hyphenated form of a reference numeral refers to a specific instance of an element and the un-hyphenated form of the reference numeral refers to the element generically or collectively. Thus, for example, element "102-1" refers to an instance of an element class, which may be referred to collectively as elements "102" and any one of which may be referred to generically as an element "102."

Distribution of multimedia content over a service provider network to a user location may occur by establishing a communication session. When establishing a session in which a multimedia program is broadcast to the user's set-top box (STB) location, the user may make a request for the multimedia program. In an example case, the outgoing request and the incoming broadcast are processed by a residential gateway (RG). Within a service provider network, a Video Ready Access Device (VRAD) or Digital Subscriber-Line Access Multiplexer (DSLAM) may be employed for sending the requested multimedia program to the user's STB. The first STB that receives the multimedia program from the VRAD or DSLAM may have a choice of which frame within a multimedia stream to lock onto for a first display. Any subsequent STBs within the user's location that also request the same multimedia program may similarly have a choice of which frame within another instance of the multimedia stream to lock onto for a second display. In accordance with disclosed embodiments, a plurality of STBs that each display an instance of a multimedia program are enabled to lock to the same frame to provide substantially simultaneous display of a plurality of instances of the multimedia program.

In some embodiments, one or more STBs at a user location maintain a table or tables that include indications of which multimedia program is being displayed and which frame within the multimedia program is being displayed at a particular time. In other words, the play point of STBs at particular times are maintained in the table or tables. In some embodiments, one STB (e.g., a master STB) may ping other STBs with an indication of which frame is displayed at a particular instant. A ping may include a frame identification value and a timestamp that can be used by other STBs to synchronize to the pinging STB. The other STBs (e.g., slave STBs) may receive the ping or indication of the play point from the master STB and adjust their play points to match the pinging STB. In illustrative embodiments, a global clock may be accessed by each STB to help in determining upon which frame the STB should lock to accomplish synchronization. Synchronization of a multimedia stream may occur after the multimedia stream is decoded or before the multimedia stream is decoded. In some embodiments, an audio track may be used to synchronize instances of a multimedia stream. Audio events may be generated by an audio event generator that analyzes an audio stream and timestamps events that can be referenced by other STBs. In other embodiments, a video track may be used to synchronize the instances of the multimedia stream. In some embodiments, a first STB (e.g., a master STB) creates one or more hash values of multimedia stream data (e.g., individual video frames) to result in a "fingerprint" for the particular data. In a second STB, similar hashes may be performed on frames of a video image captured from another instance of the multimedia stream to determine a match for frames displayed on the first STB. The first STB may communicate the hash or a series of hashes to the second STB for the second STB to use in processing which frame to use in locking. After an initial lock by one STB to the play point of another STB, the STBs may periodically (or in response to a user input or other event) resynchronize with each other.

In some embodiments, STBs communicate with each other over a wide area network (WAN), a service provider network, a local area network (LAN) or a Home Phoneline Networking Alliance (HPNA) compliant network to enable synchronization of play points. A first STB may lock into a particular frame (e.g., a picture-in-picture (PIP) frame) that is marked with an address, index value, sequential label, or other identifier in addition to a timestamp. The first STB may then communicate over a network or directly (e.g., wirelessly) to a second STB regarding which frame is being displayed at a particular time on a display supplied by the first STB. In response, the second STB may adjust its timing (i.e., its play point) based on information received from the first STB so that corresponding frames are displayed simultaneously or substantially simultaneously on the two or more displays supplied by the communicating STBs. If there are latencies in communicating timing information from one STB to another, the instances of the multimedia event may occur only substantially simultaneously. In addition, if the first STB and the second STB rely on clocks that are imperfectly synchronized, instances of the multimedia program may only occur substantially simultaneously rather than exactly simultaneously. However, in operation, disclosed embodiments are intended to present instances of a multimedia program on two or more displays with sufficient synchronization that a human is unable to detect any delay. Alternatively, the display of multiple instances of a multimedia program may be intentionally delayed or advanced to optimize the display within one or more locations. In such situations, synchronization may occur by having the audio or video portions of a multimedia program that is presented by one STB delayed in relation to the presentation of another instance of the multimedia program by another STB. For example, when presenting multiple instances of the audio portion of a multimedia program, depending on the location of a user, it may be desirable for one STB to present audio slightly ahead or behind the audio of another STB. In such cases, a user may be provided through a graphical user interface (GUI) or otherwise with the opportunity to advance or delay the audio portion on either STB to prevent echo effects that may otherwise be detected at the user's listening position.

Accordingly, disclosed embodiments support the correction of deficiencies related to unsynchronized presentation of multiple instances of a multimedia program. Using disclosed embodiments, each television (or each STB) connected to an Internet Protocol Television (IPTV) system, for example, may lock onto the same frame to allow simultaneous presentation of the multimedia program. Such systems help prevent problems, for example, in homes that have the same multimedia program playing in different rooms with the audio portion of the multimedia program overlapping between the rooms. In such cases, consumers in each room may hear the other's television. If the audio is out of sync, it obviously may be distracting or annoying. Similarly, in cases in which a business has multiple televisions in a single large room such as a waiting room or restaurant area, synchronization of audio and video portions of instances of a multimedia program is important.

When receiving multimedia programs from a service provider network, multiple STBs within a location may lock onto the same signal. Locking onto the same signal or an accurately replicated version of a signal helps prevent synchronization issues. However, within some service provider networks that rely on IP-based transport systems, instances of a multimedia stream may be sent to STBs within a location at slightly different times. Furthermore, if multiple STBs within a user location store (i.e., buffer) instances of the multimedia stream or portions of the multimedia streams, the STBs may lock on to different (i.e., non-corresponding) frames within the buffered streams. Such systems may result in the presentation of one instance of a multimedia program occurring before or after the presentation of another instance of the multimedia program that is displayed at the same location.

In some embodiments, a computer program product stored on one or more computer readable mediums (e.g., firmware within each STB at a location) executes instructions for determining which frame other STBs are presenting at a given time. In other words, a play point for other STBs is determined by the instructions. In the event there is more than one STB already using the same multimedia stream, an STB may determine which frame only one other STB (e.g., a master STB) is playing, since it may be assumed that other STBs have already been synchronized. In some embodiments, a local STB analyzes the timing of a multimedia stream received by a remote STB to determine which frame the remote STB is processing.

In accordance with disclosed embodiments, multimedia programs may be transmitted in compliance with one or more versions of Moving Picture Experts Group (MPEG) standards. For example, multimedia streams may be transmitted using MPEG-2, which is a well-known standard that is commonly used to deliver multimedia content (e.g., video and audio content) over IP networks. Delivery methods for sending multimedia content using MPEG-2 include file transfer, broadcast, and video-on-demand (VOD). Broadcast events and VOD events are types of real-time multimedia programs that may be movies, television shows, concerts, and other types of visual performances that may be synchronized on multiple displays (with accompanying audio portions) in accordance with disclosed embodiments.

Aspects of picture-in-picture functionality may be incorporated by disclosed embodiments. Picture-in-picture (sometimes referred to herein as "PIP") is a video feature that allows for the presentation of more than one video image within a display area of another video image, for example. Picture-in-picture may also relate to video images that are displayed side-by-side or in a tiled format. Picture-in-picture typically allows a viewer to watch more than one program simultaneously. In some service provider networks that support PIP functionality, when a user requests more than one multimedia program for simultaneous, picture-in-picture display, the programs may be broadcast to the user with PIP frames that have a lesser resolution.

In some instances in which PIP functionality has not been requested, a service provider network may respond to user requests to tune to a new channel by initially sending picture-in-picture frames that are at a relatively lower resolution than what is typically used for viewing. Sending multimedia content using picture-in-picture frames at a lower resolution allows for faster responses, because more data can be sent at lower resolutions with a given amount of bandwidth. Such systems that initially send PIP frames in response to channel changes promote faster responses to channel changes, so that users may rapidly change channels without excessive latencies. In accordance with disclosed embodiments, PIP frames that are initially sent in response to a channel change may be labeled, tagged, or addressed to provide a synchronization module, for example, with references to describe the play point for an STB.

Before describing other details of embodied methods and devices, selected aspects of service provider networks that provide multimedia programs are described to provide further context.

Television programs, VOD, radio programs including music programs, and a variety of other types of multimedia content may be distributed to multiple users (e.g., subscribers) over various types of networks. Suitable types of networks that may be configured to support the provisioning of multimedia content services by a service provider include, as examples, telephony-based networks, coaxial-based networks, satellite-based networks, and the like.

In some networks including, for example, traditional coaxial-based "cable" networks, whether analog or digital, a service provider distributes a mixed signal that includes a relatively large number of multimedia content channels (also referred to herein as "channels"), each occupying a different frequency band or channel, through a coaxial cable, a fiber-optic cable, or a combination of the two. The enormous bandwidth required to transport simultaneously large numbers of multimedia channels is a source of constant challenge for cable-based providers. In these types of networks, a tuner within a STB, television, or other form of receiver is required to select a channel from the mixed signal for playing or recording. A subscriber wishing to play or record multiple channels typically needs to have distinct tuners for each desired channel. This is an inherent limitation of cable networks and other mixed signal networks.

In contrast to mixed signal networks, IPTV networks generally distribute content to a subscriber only in response to a subscriber request so that, at any given time, the number of content channels being provided to a subscriber is relatively small, e.g., one channel for each operating television plus possibly one or two channels for simultaneous recording. As suggested by the name, IPTV networks typically employ IP and other open, mature, and pervasive networking technologies. Instead of being associated with a particular frequency band, an IPTV television program, movie, or other form of multimedia content is a packet-based stream that corresponds to a particular network address, e.g., an IP address. In these networks, the concept of a channel is inherently distinct from the frequency channels native to mixed signal networks. Moreover, whereas a mixed signal network requires a hardware intensive tuner for every channel to be played, IPTV channels can be "tuned" simply by transmitting to a server an IP or analogous type of network address that is associated with the desired channel.

IPTV may be implemented, at least in part, over existing infrastructure including, for example, existing telephone lines, possibly in combination with customer premise equipment (CPE) including, for example, a DSL modem in communication with a STB, a display, and other appropriate equipment to receive multimedia content from a provider network and convert such content into usable form. In some implementations, a core portion of an IPTV network is implemented with fiber optic cables while the so-called last mile may include conventional, unshielded, twisted-pair, copper cables.

IPTV networks support bidirectional (i.e., two-way) communication between a subscriber's CPE and a service provider's equipment. Bidirectional communication allows a service provider to deploy advanced features, such as VOD, pay-per-view, advanced programming information (e.g., sophisticated and customizable programming guides), and the like. Bidirectional networks may also enable a service provider to collect information related to a subscriber's preferences, whether for purposes of providing preference based features to the subscriber, providing potentially valuable information to service providers, or potentially lucrative information to content providers and others.

Figure 1:
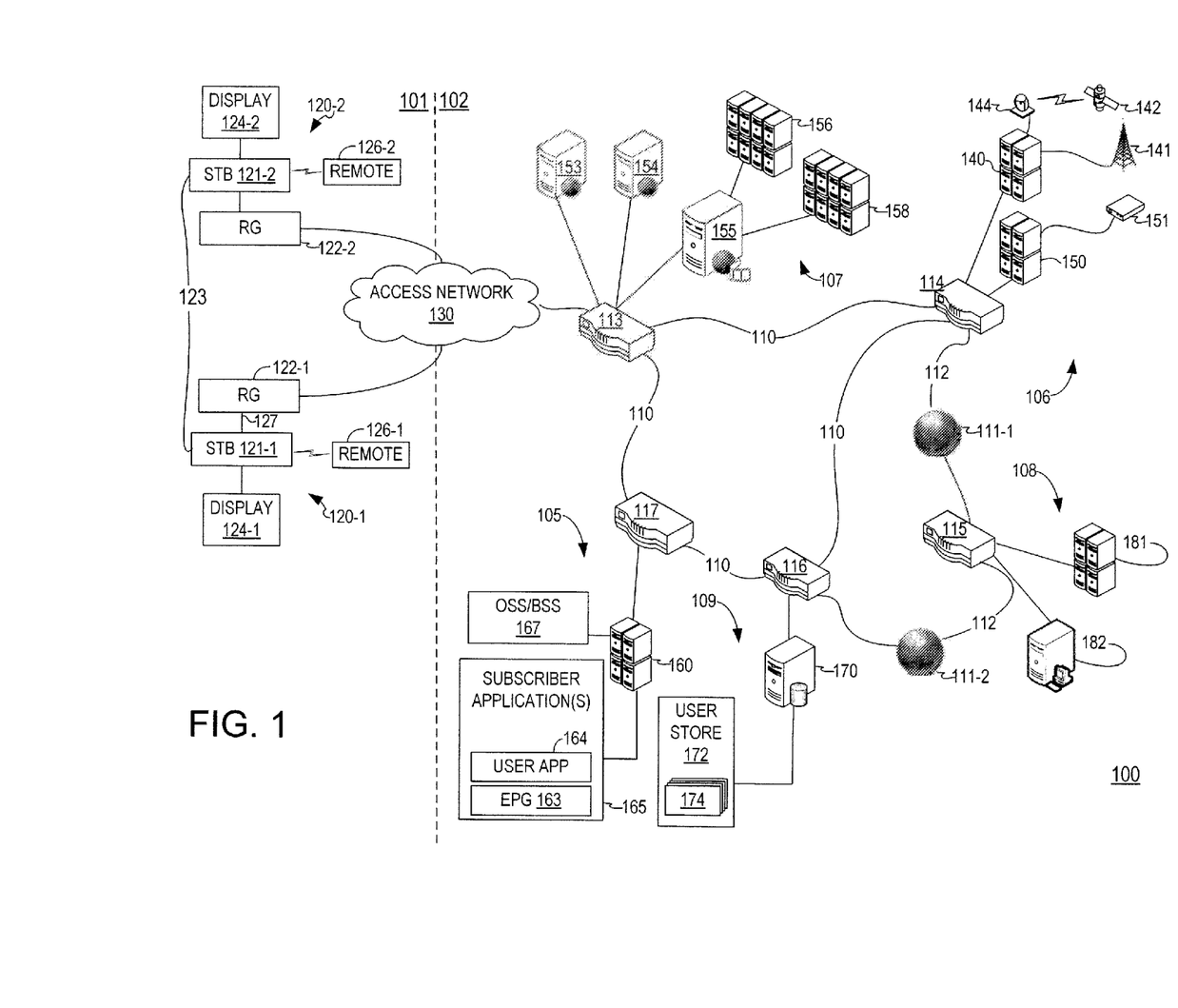
FIG. 1 is a block diagram of selected elements of an embodiment of a multimedia content distribution network that includes an embodied set-top box.

Referring now to the drawings, FIG. 1 illustrates selected aspects of a multimedia content distribution network (MCDN) 100. MCDN 100, as shown, is a provider network that may be generally divided into a client side 101 and a service provider side 102 (a.k.a. server side 102). The client side 101 includes all or most of the resources depicted to the left of access network 130 while the server side 102 encompasses the remainder.

Client side 101 and server side 102 are linked by access network 130. In embodiments of MCDN 100 that leverage telephony hardware and infrastructure, access network 130 may include the "local loop" or "last mile," which refers to the physical wires that connect a subscriber's home or business to a local exchange. In these embodiments, the physical layer of access network 130 may include twisted pair copper cables or fiber optics cables employed as either fiber to the curb (FTTC) or fiber to the home (FTTH).

Access network 130 may include hardware and firmware to perform signal translation when access network 130 includes multiple types of physical media. For example, an access network that includes twisted-pair telephone lines to deliver multimedia content to consumers may utilize DSL. In embodiments of access network 130 that implement FTTC, a DSL access multiplexer (DSLAM) may be used within access network 130 to transfer signals containing multimedia content from optical fiber to copper wire for DSL delivery to consumers.

In other embodiments, access network 130 may transmit radio frequency (RF) signals over coaxial cables. In these embodiments, access network 130 may utilize quadrature amplitude modulation (QAM) equipment for downstream traffic. In these embodiments, access network 130 may receive upstream traffic from a consumer's location using quadrature phase shift keying (QPSK) modulated RF signals. In such embodiments, a cable modem termination system (CMTS) may be used to mediate between IP-based traffic on private network 110 and access network 130.

Services provided by the server side resources as shown in FIG. 1 may be distributed over a private network 110. In some embodiments, private network 110 is referred to as a "core network." In at least some embodiments, private network 110 includes a fiber optic WAN, referred to herein as the fiber backbone, and one or more video hub offices (VHOs). In large-scale implementations of MCDN 100, which may cover a geographic region comparable, for example, to the region served by telephony-based broadband services, private network 110 includes a hierarchy of VHOs.

A national VHO, for example, may deliver national content feeds to several regional VHOs, each of which may include its own acquisition resources to acquire local content, such as the local affiliate of a national network, and to inject local content such as advertising and public service announcements from local entities. The regional VHOs may then deliver the local and national content for reception by subscribers served by the regional VHO. The hierarchical arrangement of VHOs, in addition to facilitating localized or regionalized content provisioning, may conserve bandwidth by limiting the content that is transmitted over the core network and injecting regional content "downstream" from the core network.

Segments of private network 110, as shown in FIG. 1, are connected together with a plurality of network switching and routing devices referred to simply as switches 113 through 117. The depicted switches include client facing switch 113, acquisition switch 114, operations-systems-support/business-systems-support (OSS/BSS) switch 115, database switch 116, and an application switch 117. In addition to providing routing/switching functionality, switches 113 through 117 preferably include hardware or firmware firewalls, not depicted, that maintain the security and privacy of network 110. Other portions of MCDN 100 communicate over a public network 112, including, for example, the Internet or other type of web-network where the public network 112 is signified in FIG. 1 by the World Wide Web icons 111.

As shown in FIG. 1, the client side 101 of MCDN 100 depicts two of a potentially large number of client side resources referred to herein simply as client(s) 120. Each client 120, as shown, includes an STB 121, a residential gateway (RG) 122, a display 124, and a remote control device 126. In the depicted embodiment, STB 121 communicates with server side devices through access network 130 via RG 122.

RG 122 may include elements of a broadband modem such as a DSL modem, as well as elements of a router and/or access point for an Ethernet or other suitable LAN 127. In this embodiment, STB 121 is a uniquely addressable Ethernet compliant device. In some embodiments, display 124 may be any National Television System Committee (NTSC) and/or Phase Alternating Line (PAL) compliant display device. Both STB 121 and display 124 may include any form of conventional frequency tuner. Remote control device 126 communicates wirelessly with STB 121 using an infrared (IR) or RF signal.

In IPTV compliant implementations of MCDN 100, the clients 120 are operable to receive packet-based multimedia streams from access network 130 and process the streams for presentation on displays 124. In addition, clients 120 are network-aware systems that may facilitate bidirectional-networked communications with server side 102 resources to facilitate network hosted services and features. Because clients 120 are operable to process multimedia content streams while simultaneously supporting more traditional web-like communications, clients 120 may support or comply with a variety of different types of network protocols including streaming protocols such as reliable datagram protocol (RDP) over user datagram protocol/internet protocol (UDP/IP) as well as web protocols such as hypertext transport protocol (HTTP) over transport control protocol (TCP/IP).

The server side 102 of MCDN 100 as depicted in FIG. 1 emphasizes network capabilities including application resources 105, which may have access to database resources 109, content acquisition resources 106, content delivery resources 107, and OSS/BSS resources 108.

Before distributing multimedia content to users, MCDN 100 first obtains multimedia content from content providers. To that end, acquisition resources 106 encompass various systems and devices to acquire multimedia content, reformat it when necessary, and process it for delivery to subscribers over private network 110 and access network 130.

Acquisition resources 106 may include, for example, systems for capturing analog and/or digital content feeds, either directly from a content provider or from a content aggregation facility. Content feeds transmitted via VHF/UHF broadcast signals may be captured by an antenna 141 and delivered to live acquisition server 140. Similarly, live acquisition server 140 may capture down linked signals transmitted by a satellite 142 and received by a parabolic dish 144. In addition, live acquisition server 140 may acquire programming feeds transmitted via high-speed fiber feeds or other suitable transmission means. Acquisition resources 106 may further include signal conditioning systems and content preparation systems for encoding content.

As depicted in FIG. 1, content acquisition resources 106 include a VOD acquisition server 150. VOD acquisition server 150 receives content from one or more VOD sources that may be external to the MCDN 100 including, as examples, discs represented by a DVD player 151, or transmitted feeds (not shown). VOD acquisition server 150 may temporarily store multimedia content for transmission to a VOD delivery server 158 in communication with client-facing switch 113.

After acquiring multimedia content, acquisition resources 106 may transmit acquired content over private network 110, for example, to one or more servers in content delivery resources 107. Prior to transmission, live acquisition server 140 may encode acquired content using, e.g., MPEG-2, H.263, a Windows Media Video (WMV) family codec, or another suitable video codec. Acquired content may be encoded and composed to preserve network bandwidth and network storage resources and, optionally, to provide encryption for securing the content. VOD content acquired by VOD acquisition server 150 may be in a compressed format prior to acquisition and further compression or formatting prior to transmission may be unnecessary and/or optional.

Content delivery resources 107 as shown in FIG. 1 are in communication with private network 110 via client facing switch 113. In the depicted implementation, content delivery resources 107 include a content delivery server 155 in communication with a live or real-time content server 156 and a VOD delivery server 158. For purposes of this disclosure, the use of the term "live" or "real-time" in connection with content server 156 is intended primarily to distinguish the applicable content from the content provided by VOD delivery server 158. The content provided by a VOD server is sometimes referred to as time-shifted content to emphasize the ability to obtain and view VOD content substantially without regard to the time of day or the day of week.

Content delivery server 155, in conjunction with live content server 156 and VOD delivery server 158, responds to user requests for content by providing the requested content to the user. The content delivery resources 107 are, in some embodiments, responsible for creating video streams that are suitable for transmission over private network 110 and/or access network 130. In some embodiments, creating video streams from the stored content generally includes generating data packets by encapsulating relatively small segments of the stored content in one or more packet headers according to the network communication protocol stack in use. These data packets are then transmitted across a network to a receiver (e.g., STB 121 of client 120), where the content is parsed from individual packets and re-assembled into multimedia content suitable for processing by a STB decoder.

User requests received by content delivery server 155 may include an indication of the content that is being requested. In some embodiments, this indication includes an IP address associated with the desired content. For example, a particular local broadcast television station may be associated with a particular channel and the feed for that channel may be associated with a particular IP address. When a subscriber wishes to view the station, the subscriber may interact with remote control device 126 to send a signal to STB 121 indicating a request for the particular channel. When STB 121 responds to the remote control signal, the STB 121 changes to the requested channel by transmitting a request that includes an IP address associated with the desired channel to content delivery server 155.

Content delivery server 155 may respond to a request by making a streaming video signal accessible to the user. Content delivery server 155 may employ unicast and broadcast techniques when making content available to a user. In the case of multicast, content delivery server 155 employs a multicast protocol to deliver a single originating stream to multiple clients. When a new user requests the content associated with a multicast stream, there may be latency associated with updating the multicast information to reflect the new user as a part of the multicast group. To avoid exposing this undesirable latency to the subscriber, content delivery server 155 may temporarily unicast a stream to the requesting subscriber. When the subscriber is ultimately enrolled in the multicast group, the unicast stream is terminated and the subscriber receives the multicast stream. Multicasting desirably reduces bandwidth consumption by reducing the number of streams that must be transmitted over the access network 130 to clients 120.

As illustrated in FIG. 1, a client-facing switch 113 provides a conduit between subscriber side 101, including client 120, and server side 102. Client-facing switch 113, as shown, is so-named because it connects directly to the client 120 via access network 130 and it provides the network connectivity of IPTV services to users' locations.

To deliver multimedia content, client-facing switch 113 may employ any of various existing or future Internet protocols for providing reliable real-time streaming multimedia content. In addition to the TCP, UDP, and HTTP protocols referenced above, such protocols may use, in various combinations, other protocols including, real-time transport protocol (RTP), real-time control protocol (RTCP), file transfer protocol (FTP), and real-time streaming protocol (RTSP), as examples.

In some embodiments, client-facing switch 113 routes multimedia content encapsulated into IP packets over access network 130. For example, an MPEG-2 transport stream may be sent, in which the transport stream consists of a series of 188-byte transport packets, for example. Client-facing switch 113 as shown is coupled to a content delivery server 155, acquisition switch 114, applications switch 117, a client gateway 153, and a terminal server 154 that is operable to provide terminal devices with a connection point to the private network 110. Client gateway 153 may provide subscriber access to private network 110 and the resources coupled thereto.

In some embodiments, STB 121 may access MCDN 100 using information received from client gateway 153. Subscriber devices may access client gateway 153 and client gateway 153 may then allow such devices to access the private network 110 once the devices are authenticated or verified. Similarly, client gateway 153 may prevent unauthorized devices, such as hacker computers or stolen STBs, from accessing the private network 110. Accordingly, in some embodiments, when an STB 121 accesses MCDN 100, client gateway 153 verifies subscriber information by communicating with user store 172 via the private network 110. Client gateway 153 may verify billing information and subscriber status by communicating with an OSS/BSS gateway 167. OSS/BSS gateway 167 may transmit a query to the OSS/BSS server 181 via an OSS/BSS switch 115 that may be connected to a public network 112. Upon client gateway 153 confirming subscriber and/or billing information, client gateway 153 may allow STB 121 access to IPTV content, VOD content, and other services. If client gateway 153 cannot verify subscriber information for STB 121, for example, because it is connected to an unauthorized twisted pair or RG, client gateway 153 may block transmissions to and from STB 121 beyond the private access network 130.

MCDN 100, as depicted, includes application resources 105, which communicate with private network 110 via application switch 117. Application resources 105 as shown include an application server 160 operable to host or otherwise facilitate one or more subscriber applications 165 that may be made available to system subscribers. For example, subscriber applications 165 as shown include an electronic programming guide (EPG) application 163. Subscriber applications 165 may include other applications as well. In addition to subscriber applications 165, application server 160 may host or provide a gateway to operation support systems and/or business support systems. In some embodiments, communication between application server 160 and the applications that it hosts and/or communication between application server 160 and client 120 may be via a conventional web based protocol stack such as HTTP over TCP/IP or HTTP over UDP/IP.

Application server 160 as shown also hosts an application referred to generically as user application 164. User application 164 represents an application that may deliver a value added feature to a subscriber. User application 164 is illustrated in FIG. 1 to emphasize the ability to extend the network's capabilities by implementing a networked hosted application. Because the application resides on the network, it generally does not impose any significant requirements or imply any substantial modifications to the client 120 including the STB 121. In some instances, an STB 121 may require knowledge of a network address associated with user application 164, but STB 121 and the other components of client 120 are largely unaffected.

As shown in FIG. 1, a database switch 116 connected to applications switch 117 provides access to database resources 109. Database resources 109 include a database server 170 that manages a system storage resource 172, also referred to herein as user store 172. User store 172, as shown, includes one or more user profiles 174 where each user profile includes account information and may include preferences information that may be retrieved by applications executing on application server 160 including subscriber application 165.

MCDN 100, as shown, includes an OSS/BSS resource 108 including an OSS/BSS switch 115. OSS/BSS switch 115 facilitates communication between OSS/BSS resources 108 via public network 112. The OSS/BSS switch 115 is coupled to an OSS/BSS server 181 that hosts operations support services including remote management via a management server 182. OSS/BSS resources 108 may include a monitor server (not depicted) that monitors network devices within or coupled to MCDN 100 via, for example, a simple network management protocol (SNMP).

Figure 2:
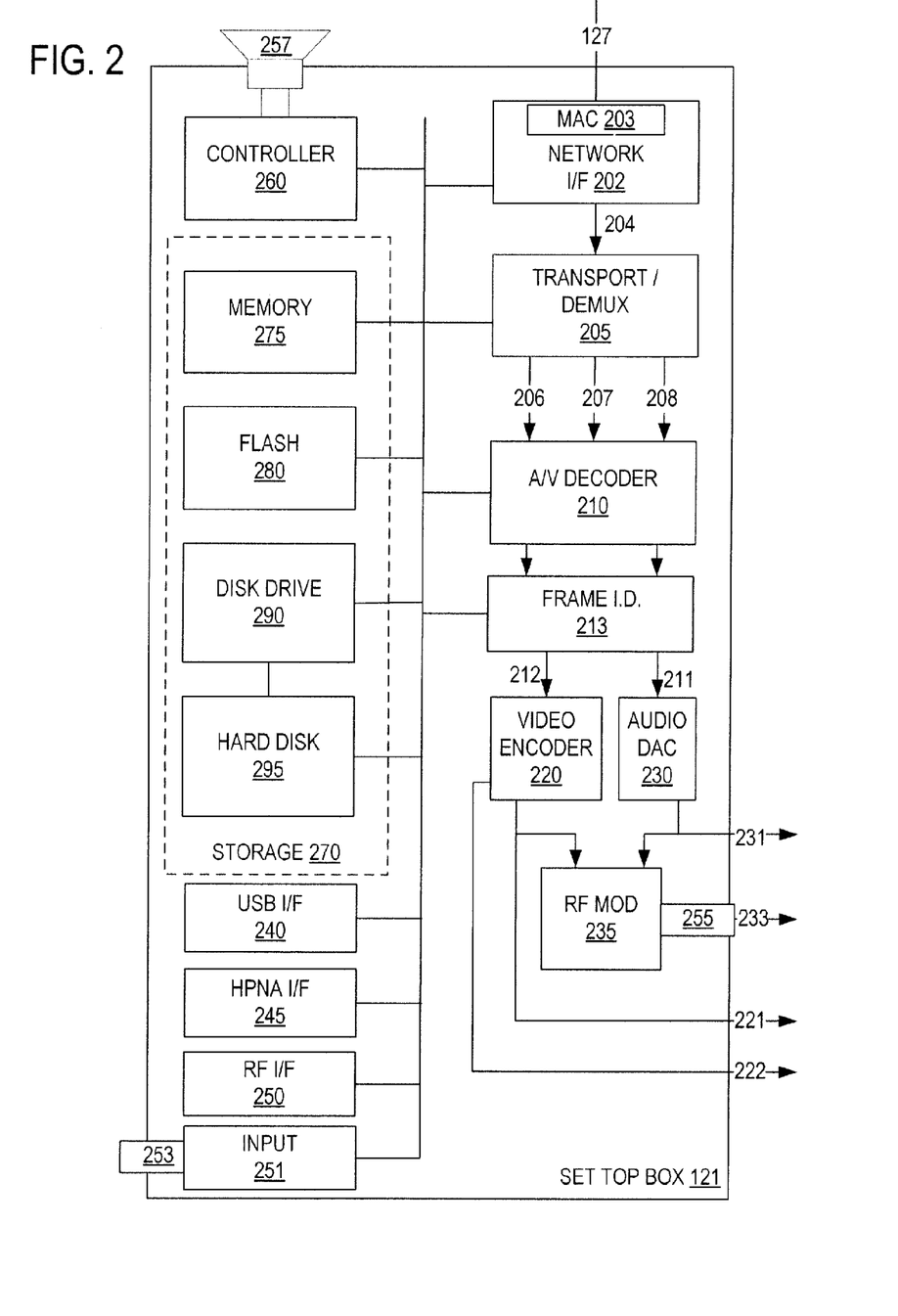
FIG. 2 is a block diagram of selected elements of an embodied set-top box.

Turning now to FIG. 2, selected components of an embodiment of the STB 121 in the IPTV client 120 of FIG. 1 are illustrated. Regardless of the specific implementation, of which STB 121 as shown in FIG. 2 is but an example, an STB 121 suitable for use in an IPTV client includes hardware and/or software functionality to receive streaming multimedia data from an IP-based network and process the data to produce video and audio signals suitable for delivery to an NTSC, PAL, or other type of display 124. In addition, some embodiments of STB 121 may include resources to store multimedia content locally and resources to play back locally stored multimedia content.

In the embodiment depicted in FIG. 2, STB 121 includes a general-purpose processing core represented as controller 260 in communication with various special purpose multimedia modules. These modules may include a transport/demultiplexer module 205, an A/V decoder 210, a video encoder 220, an audio digital-to-analog converter (DAC) 230, and an RF modulator 235. Although FIG. 2 depicts each of these modules discretely, STB 121 may be implemented with a system on chip (SoC) device that integrates controller 260 and each of these multimedia modules. In still other embodiments, STB 121 may include an embedded processor serving as controller 260 and at least some of the multimedia modules may be implemented with a general-purpose digital signal processor (DSP) and supporting software.

As shown in FIG. 2, output jack 255 is for providing synchronization signals that, for example, correspond to a play point of an instance of a multimedia program. Similarly, speaker 257 is for providing audible sounds generated from the audio portion of an instance of a multimedia program. As shown, input jack 253 is coupled to input module 251 for receiving inputs that may be used in determining the play point of another STB. For example, input jack 253 may be a microphone jack or may represent a microphone capable of providing audio or electrical signals. In other embodiments, input 251 includes a network connection (e.g., HPNA compliant connection) and STB 121 is enabled for synchronizing with remote devices (e.g., remote STBs) by receiving frame identification values at input 251 indicative of the play point or play points of the remote devices. In some embodiments, the remote play point corresponds to the point at which a first instance of a multimedia program is being displayed. As shown, STB 121 further utilizes controller 260 that is enabled for aligning a local play point of STB 121 with the remote play point to generate a second instance of the multimedia program substantially synchronized with the first instance of the multimedia program. The second instance of the multimedia program is output by STB 121 for use with a display (e.g., display 124 in FIG. 1) and any associated audio equipment. Data indicative of the audio inputs received at input 251 may be stored in storage 270. In some embodiments, the audio inputs stored in storage 270 may be indexed with identifiers and timestamps and analyzed for determining audio events.

Regardless of the implementation details of the multimedia processing hardware, STB 121 as shown in FIG. 2 includes a network interface 202 that enables STB 121 to communicate with an external network such as LAN 127. Network interface 202 may share many characteristics with conventional network interface cards (NICs) used in personal computer platforms. For embodiments in which LAN 127 is an Ethernet LAN, for example, network interface 202 implements level 1 (physical) and level 2 (data link) layers of a standard communication protocol stack by enabling access to the twisted pair or other form of physical network medium and by supporting low level addressing using media access control (MAC) addressing. In these embodiments, every network interface 202 includes, for example, a globally unique 48-bit MAC address 203 stored in a read-only memory (ROM) or other persistent storage element of network interface 202. Similarly, at the other end of the LAN connection 127, RG 122 has a network interface (not depicted) with its own globally unique MAC address. Communication between STBs may be used to accomplish synchronization in accordance with disclosed embodiments.

Network interface 202 may further include or support software or firmware providing one or more complete network communication protocol stacks. Where network interface 202 is tasked with receiving streaming multimedia communications, for example, network interface 202 may include a streaming video protocol stack such as an RTP/UDP stack. In these embodiments, network interface 202 is operable to receive a series of streaming multimedia packets and process them to generate a digital multimedia stream 204 that is provided to transport/demux 205.

The digital multimedia stream 204 is a sequence of digital information that includes interlaced audio data streams and video data streams. The video and audio data contained in digital multimedia stream 204 may be referred to as "in-band" data in reference to a particular frequency bandwidth that such data might have been transmitted in an RF transmission environment. Digital multimedia stream 204 may also include "out-of-band" data that might encompass any type of data that is not audio or video data, but may refer in particular to data that is useful to the provider of an IPTV service. This out-of-band data might include, for example, billing data, decryption data, and data enabling the IPTV service provider to manage IPTV client 120 remotely.

Transport/demux 205 as shown is operable to segregate and possibly decrypt the audio, video, and out-of-band data in digital multimedia stream 204. Transport/demux 205 outputs a digital audio stream 206, a digital video stream 207, and an out-of-band digital stream 208 to A/V decoder 210. Transport/demux 205 may also, in some embodiments, support or communicate with various peripheral interfaces of STB 121 including a radio frequency (RF) interface 250 suitable for use with an RF remote control unit (not shown) and a front panel interface (not shown). RF interface 250 may also be compatible to receive infrared signals, light signals, laser signals, or other signals from remote control devices that use signal types that differ from RF signals. RF interface 250 represents a hardware interface that may be enabled for receiving signals indicative of user inputs. For example, a user may provide user inputs to a remote control device for selecting or highlighting EPG elements on a display.

A/V decoder 210 processes digital audio, video, and out-of-band streams 206, 207, and 208 to produce a native format digital audio stream 211 and a native format digital video stream 212. A/V decoder 210 processing may include decompression of digital audio stream 206 and/or digital video stream 207, which are generally delivered to STB 121 as compressed data streams. In some embodiments, digital audio stream 206 and digital video stream 207 are MPEG compliant streams and, in these embodiments, A/V decoder 210 is an MPEG decoder. As shown, frame identification module 213 receives digital audio, video, and out-of-band streams 206, 207, and 208 to identify frames (e.g., video frames) that are compared to play point data for an external device such as a remote STB. For example, STB 121 as shown in FIG. 2 is an embodied STB that receives one ore more hash values from another STB (e.g., a remote STB) that contains hash results for one or more video frames with associated timestamps. Similarly, frame identification module 213 may conduct hashes of frames incorporated into digital video stream 207 for determining a local play point. STB 121 may then compare the local play point to the remote point and determine whether STB 121 should either advance, delay, or maintain the local play point to make the local play point (of STB 121) correspond to the remote play point. In some embodiments, frame identification module 213 is positioned upstream of A/V decoder 210 and transport/demux 205. In such cases, frame identification module receives a multimedia stream (e.g., digital multimedia stream 204) that contains audio data, video data, and perhaps other data in a single, packetized stream. In this configuration, frame identification module 213 references a frame in a multimedia stream as the multimedia streams exists prior to processing such as occurs by transport/demux 205 or A/V decoder 210. The disclosed implementations are intended as examples and are not meant to limit the claimed subject matter from including other systems, methods, equipment, and components that may be used by a local device to synchronize its play point to one or more remote devices.

The digital out-of-band stream 208 may include information about or associated with content provided through the audio and video streams. This information may include, for example, the title of a show, start and end times for the show, type or genre of the show, broadcast channel number associated with the show, and so forth. A/V decoder 210 may decode such out-of-band information. MPEG embodiments of A/V decoder 210 support a graphics plane as well as a video plane and at least some of the out-of-band information may be incorporated by A/V decoder 210 into its graphics plane and presented to the display 124, perhaps in response to a signal from a remote control device. The digital out-of-band stream 208 may be a part of an EPG, an interactive program guide or an electronic service guide (ESG). Such devices allow a user to navigate, select, and search for content by time, channel, genre, title, and the like. A typical EPG may have a GUI that enables the display of program titles and other descriptive information such as program identifiers, a summary of subject matter for programs, names of actors, names of directors, year of production, and the like.

The native format digital audio stream 211 as shown in FIG. 2 is routed to an audio DAC 230 to produce an audio output signal 231. The native format digital video stream 212 is routed to an NTSC/PAL or other suitable video encoder 220, which generates digital video output signals suitable for presentation to an NTSC or PAL compliant display device. In the depicted embodiment, for example, video encoder 220 generates a composite video output signal 221 and an S video output signal 222. An RF modulator 235 receives the audio and composite video output signals 231 and 221 respectively and generates an RF output signal 233 suitable for providing to an analog input of a display (e.g., display 124 from FIG. 1). Additionally output jack 255 may be used to plug in a headset for providing audio signals.

In addition to the multimedia modules described, STB 121 as shown includes and various peripheral interfaces. STB 121 as shown includes, for example, a universal serial bus (USB) interface 240 and a local interconnection interface 245. Local interconnection interface 245 may, in some embodiments, support the HPNA or other form of local interconnection 123 shown in FIG. 1. In accordance with disclosed embodiments, as shown in FIG. 1, STB 121-1 communicates with STB 121-2 over local interconnection 123 to accomplish synchronization regarding the display of instances of a multimedia program on display 124-1 and 124-2. As an example, an instance of a multimedia program may be displayed on display 124-2 as provided by STB 121-2. Accordingly, RG 122-2 receives a multimedia stream from access network 130. If a user of STB 121-1 uses remote control device 126-1 to provide user input to request another instance of the multimedia program for presentation on display 124-1, STB 121-1 sends a request through RG 122-1 for the broadcast of the multimedia program from access network 130. Either before, during or simultaneously with sending the request for the broadcast of the multimedia program, STB 121-1 may request a play point from STB 121-2 over local interconnection 123, in accordance with disclosed embodiments. Alternatively, STB 121-1 may send a request for the play point of STB 121-2 through access network 130. In this way, STB 121-1 learns of the play point of STB 121-2 so that the presentation of the multiple instances of the multimedia program is synchronized. After learning of the play point of STB 121-2, STB 121-1 sets its local play point (i.e., the play point of STB 121-1) to match the remote play point (i.e., the play point of STB 121-2). Having synchronized play points between the two STBs helps to prevent a user of STB 121-1 from possibly being distracted if the user is within visual or audio range of display 124-2 or other equipment (e.g., stereo equipment, not depicted) that is presenting another instance of multimedia program.

Referring again to FIG. 2, the illustrated embodiment of STB 121 includes storage resources 270 that are accessible to controller 260 and possibly one or more of the multimedia modules. Storage 270 may include dynamic random access memory (DRAM) or another type of volatile storage identified as memory 275 as well as various forms of persistent or nonvolatile storage including flash memory 280 and/or other suitable types of persistent memory devices including ROMs, erasable programmable read-only memory (EPROMs), and electrical erasable programmable read-only memory (EEPROMs). In addition, the depicted embodiment of STB 121 includes a mass storage device in the form of one or more magnetic hard disks 295 supported by an integrated device electronics (IDE) compliant or other type of disk drive 290. Embodiments of STB 121 employing mass storage devices may be operable to store content locally and play back stored content when desired.

Figure 3:
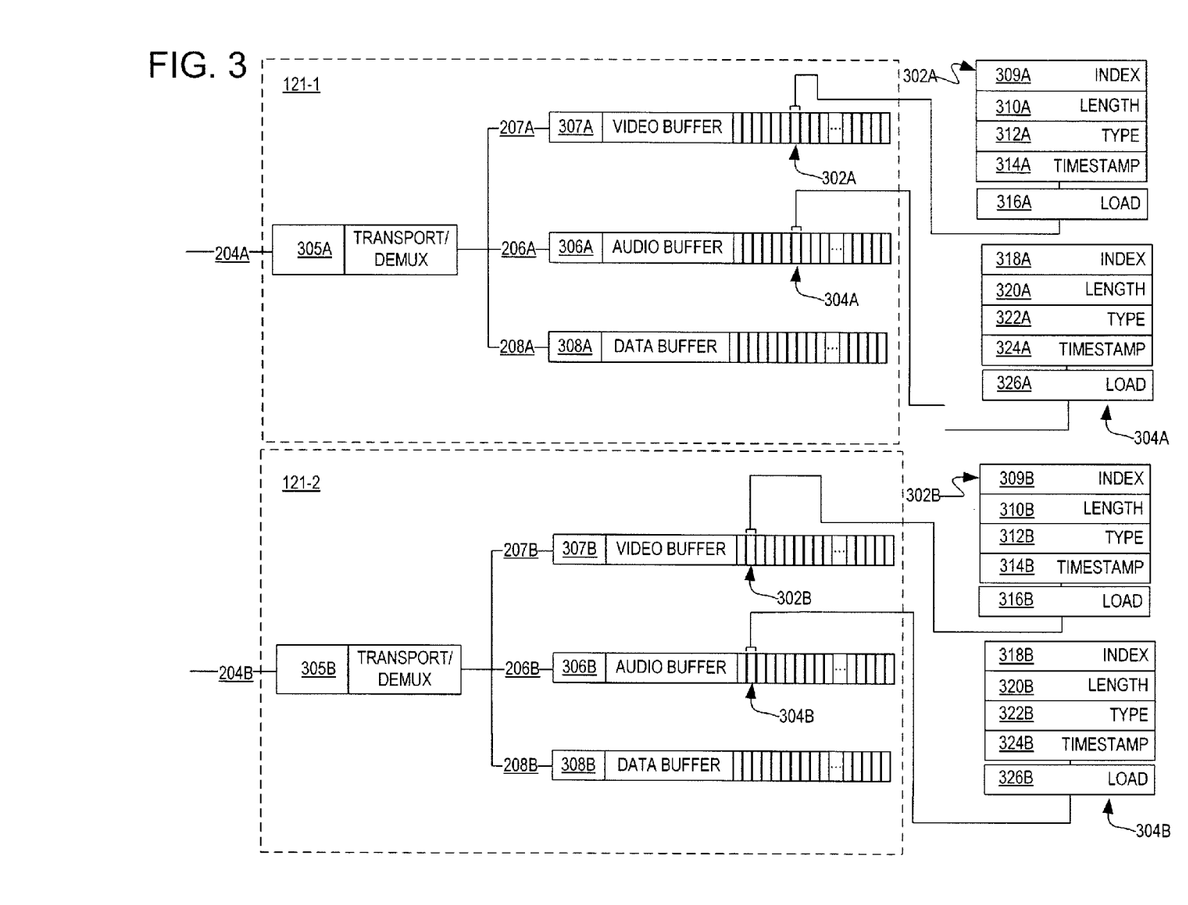
FIG. 3 illustrates selected aspects of video and audio buffers that may be used by an embodied set-top box to synchronize its play point with the play point of a remote set-top box.

FIG. 3 illustrates STBs 121 that receive incoming multimedia streams 204A and 204B which, in accordance with disclosed embodiments, carry two instances of a multimedia program. As shown, STB 121-1 receives multimedia stream 204A at transport/demux module 305A, which separates the multimedia stream into video stream 207A, audio stream 206A, and data stream 208A. Video stream 207A is received by a video buffer 307A, audio stream 206A is received by audio buffer 306A, and data stream 208A is received by data buffer 308A. As shown, STB 121-1 has a local play point 302A in video buffer 307A and a corresponding local play point 304A in audio buffer 306A. As shown, within a buffer entry from video buffer 307A at play point 302A there are stored various fields including index 309A, length 310A, type 312A, timestamp 314A and load 316A. Fields 309A-314A may be header fields that are used in identifying a local play point and comparing it to a remote play point. As shown, audio buffer 306A contains fields 318A-326A that correspond to fields 309A-316A in video buffer 307A. One or more of the fields (e.g., index 309A) are for storing a hash made of load 316A, for example. Timestamp 314A may contain timing data for determining when a particular frame should be play compared to other buffered frames. Type 312A may contain data regarding the format of the encoding or other parameters associated with a frame. Length 310A contains information regarding the length of a frame or the length of header fields, as examples. As depicted in FIG. 3, load 316A may be separated from header fields 309A-314A in video buffer 307A. For example, load 316A may be stored or buffered in separate storage (not depicted in FIG. 3) relative to buffers 306A-308A. As shown, fields stored in video buffer 307A and audio buffer 306A at play point 302A may be used by STB 121-1 to determine or establish a play point for the STB 121-1 that is synchronized with play point 302B for STB 121-2. It is noteworthy that fields stored in video buffer 307A shown at play point 302A are provided for illustrative purposes only and other embodiments may have fewer or more fields. In addition, the play points (e.g., play point 302A and 304A) are shown as referencing frames stored after processing by transport/demux module 305A. In some embodiments, play points correspond to frames that may be referenced prior to processing by an element such as transport/demux module 305A. In other words, the play point may correspond to a packet or frame from a packetized multimedia media stream that contains audio data, video data, and possibly other data. In this way, a remote device and a local device are synchronized to a particular frame before processing the frame into individual components such as audio data and video data.

Similar to STB 121-1, STB 121-2 receives a multimedia stream (i.e., multimedia stream 204B) at a transport/demux module (i.e., transport/demux module 305B). As shown, multimedia stream 204B is split into at least three streams including video stream 207B, audio stream 206B, and data stream 208B. Video stream 207B is temporarily stored (i.e., buffered) in video buffer 307B. Similarly, audio stream 206B is buffered in audio buffer 306B and data stream 208B is buffered in data buffer 308B. STB 121-2 has a video play point at 302B for both video buffer 307B and audio buffer 308B. Although not depicted in FIG. 3, in some embodiments the audio buffer play point (i.e., 302B shown at video buffer 307B) and the video buffer play point (also shown as 302B at audio buffer 306B) may differ in time to allow for a proper presentation of an instance of the multimedia program by STB 121-2. In other words, either the video portion of the multimedia stream or the audio portion of the multimedia stream may be advanced or delayed for proper synchronization between a visual display and an audio presentation related to a multimedia program. Similar to the buffers 306A-308A for the STB 121-1, the buffers 306B-308B contain various fields stored for each frame that may be used in identifying a point of play. Fields 318A-326A associated with audio buffer 306A are analogous to fields 318B-326B that are associated with audio buffer 306B. In normal operation in which audio and video portions of a multimedia stream are aligned, video buffer 307A and audio buffer 304A are accessed simultaneously at play points 302A and 304A, respectively. Accordingly, similar-numbered fields (e.g., 314A and 314B) illustrated in STB 121-2 and 121-1 have similar descriptions and, as such, the descriptions of many of STB 121-2's components are omitted and reference is hereby made to the description of similar components of STB 121-1.

Figure 4:
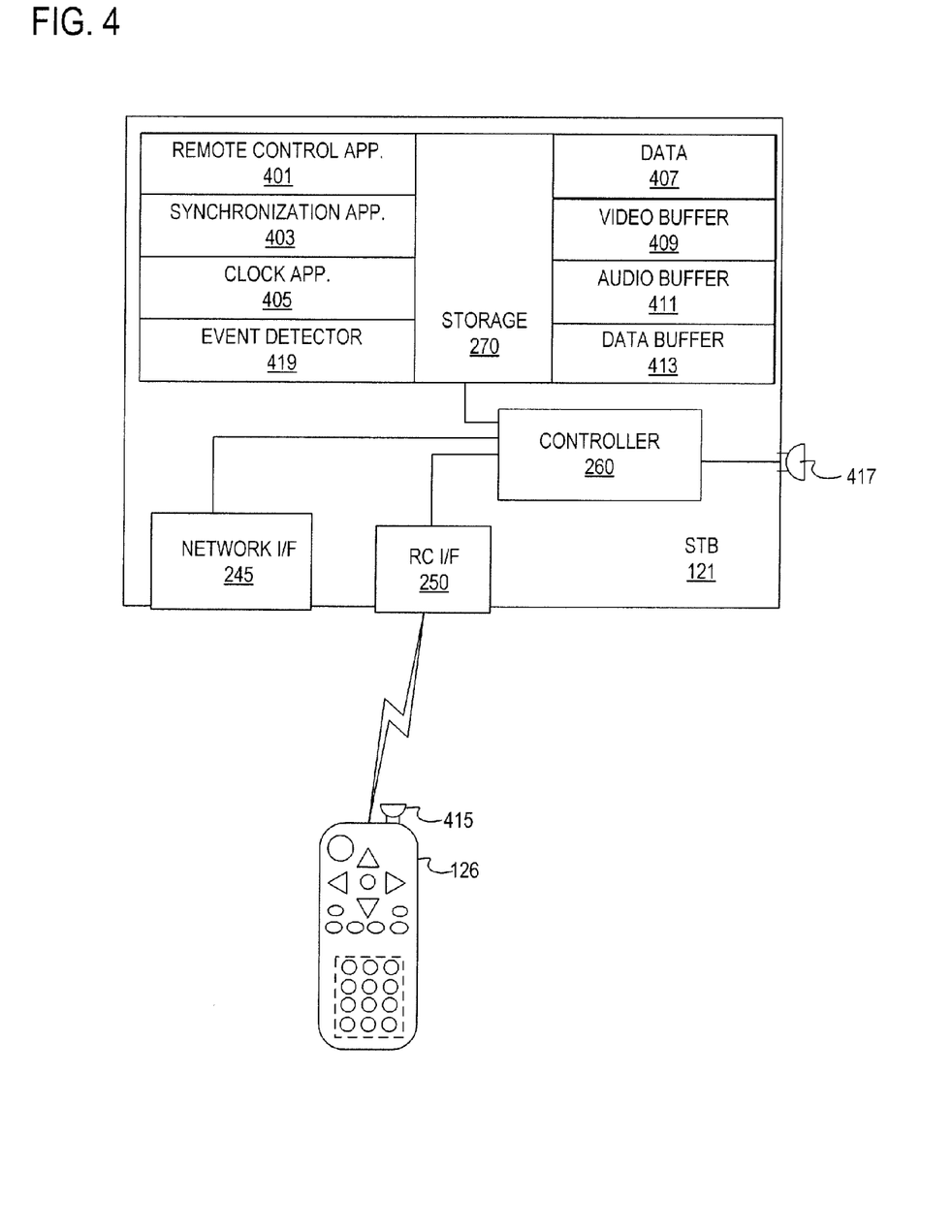
FIG. 4 depicts elements of an embodied set-top box for synchronizing to a remote set-top box's play point.

Turning now to FIG. 4, selected software elements of an STB 121 operable to support a synchronization system and method are illustrated. In the depicted implementation, the storage 270 of STB 121 includes programs or execution modules identified as remote control application 401, synchronization application 403, clock application 405, and event detector 419. In addition, the depicted implementation of storage 270 includes data 407, video buffer 409, audio buffer 411, and data buffer 413.

Remote control application 401 includes computer executable code that supports the STB's 121 remote control functionality. For example, when a user depresses a volume button on remote control device 126, remote control application 401 includes code to modify the volume signal being generated by STB 121. In some embodiments, remote control application 401 is invoked by controller 260 in response to a signal from RF interface (I/F) 250 indicating that RF I/F 250 has received a remote control command signal. Although the embodiments described herein employ a wireless remote control device 126 to convey user commands to STB 121, the user commands may be conveyed to STB 121 in other ways. For example, STB 121 may include a front panel having function buttons that are associated with various commands, some of which may coincide with commands associated with function buttons on remote control device 126. Similarly, although remote control device 126 is described herein as being an RF or IR remote control device, other embodiments may use other media and/or protocols to convey commands to STB 121. For example, remote control commands may be conveyed to STB 121 via USB, WiFi (IEEE 802.11-family protocols), and/or Bluetooth techniques, all of which are well known in the field of network communications.

RF I/F 250 may be operable to parse or otherwise extract the remote control command that is included in the signal. The remote control command may then be made available to controller 260 and/or remote control application 401. In this manner, remote control application 401 may receive an indication of the remote control command from the RF I/F 250 directly or from controller 260. In the latter case, for example, controller 260 might call remote control application 401 as a function call and include an indication of remote control device 126 as a parameter in the function call.

STB 121, as shown in FIG. 4, includes clock application 405. Clock application 405 may access a server provided time or another type of global time accessible by multiple STBs that are synchronized in accordance with disclosed embodiments. In addition, clock application 405 may be responsible for providing time stamps for use in a table stored as part of data 407. Data 407 may include a plurality of entries corresponding to a sequence of frames presented by STB 121. In some embodiments, data 407 may include the results of hashing one or more of a series of frames in addition to timestamps created with the aid of clock application 405.

As shown in FIG. 4, video buffer 409 temporarily stores (i.e., buffers) a video portion of an incoming multimedia stream that corresponds to a multimedia program. Similarly, audio buffer 411 stores an audio portion of the incoming multimedia stream and data buffer 413 stores any data that may be associated with the multimedia stream such as EPG data. As shown, synchronization application 403 is responsible for determining to which frame STB 121 should lock. If synchronization application 403 determines that STB 121 is presenting a multimedia program ahead of a remote STB (e.g., a master STB), then synchronization application 403 may cause STB 121 to delay its play point by locking to a later frame. Accordingly, synchronization application 403 locks to different frames within video buffer 409, audio buffer 411, and data buffer 413. In order to determine which frame to lock to, synchronization application 403 may access data from another STB that corresponds to data 407 within STB 121. If a remote STB stores frame identifiers (e.g., frame numbers, frame hashes, etc.) with timestamps similar to the operation STB 121, then synchronization application 403 may access the other STB (not depicted) to determine to which frame STB 121 should lock. In some embodiments, synchronization application 403 may receive pings or timing indications from a service provider network or other STBs over network interface 245. Using such timing indications, STB 121 may lock to frames that occur earlier or later in a multimedia program, to allow STB 121 to be synchronized to other STBs. In some cases, a user may provide input via remote control device 126 over RF interface 250 to either delay or advance the video or audio portion of the presentation by STB 121. In some embodiments, remote control device 126 is enabled to detect audio output sounds using microphone 415 to determine whether outputs from different televisions, for example, are out of synchronization. To this end, remote control device 126 may be positioned at a typical listening location and data may be collected that is related to the audio portion of a multimedia program presented from multiple sources. This data related to the audio portion may be received over RF interface 250 and may be used by synchronization application 403 to advance, delay, or maintain the play point of a presentation of the multimedia event from STB 121. Therefore, microphone 415 (or microphone 417) may assist in determining to what degree there is synchronization between multiple instances of the presentation of a multimedia program. In operation, upon microphone 417 relaying audio signals to controller 260, event detector 419 may be employed to create event data that may be used for marking a play point for use in aligning two or more STBs. An audio event, for example, may be a distinctive or recognizable audio sequence that can be used to mark a play point for communicating to another STB.

Figure 5:
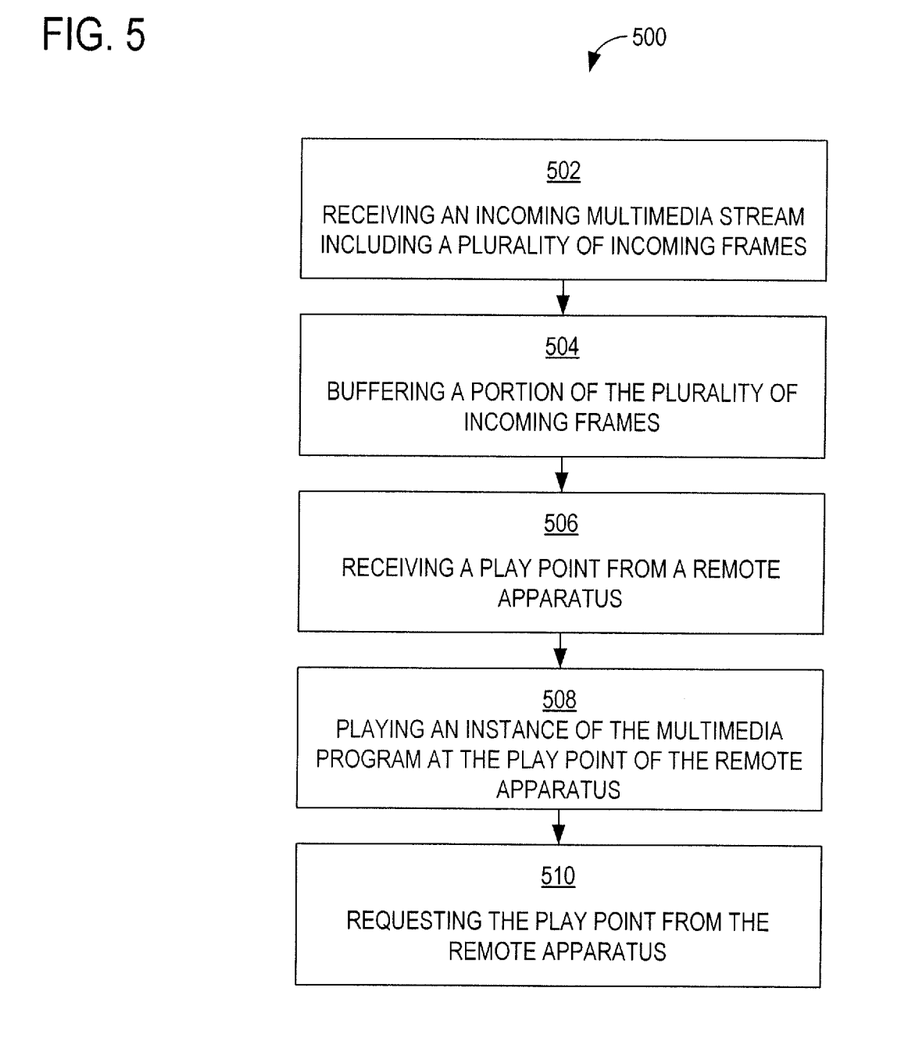
FIG. 5 is a flow diagram representing selected operations for synchronizing an embodied set-top box to a remote set-top box.

Referring now to FIG. 5, operations of methodology 500 are illustrated for frame synchronization when presenting one of a plurality of instances of a multimedia program. In operation, a first STB displays within a home or a business a first instance of a multimedia program. Within the same home or business, a user may tune another television supplied by a second STB to the same multimedia program. To prevent any interference or distractions caused by the audio or video portions of the two instances of the multimedia programs being out of sync (i.e., synchronization), the presentations may be synchronized using methodology 500. Accordingly, the second STB that is joining in to present another instance of the multimedia program may be enabled for performing methodology 500. In some cases, more than two STBs may display within a business or home numerous instances of a multimedia program. In such cases, one STB may act as a master, and the other STBs may act as slaves, with each slave STB performing methodology 500. In other environments, each subsequent STB that attempts to tune into a multimedia stream to present another instance of a multimedia program may perform methodology 500. In such cases, the latest STB to tune to the multimedia program may assume that all other STBs in communication over a local network, for example, are synchronized with other STBs already in operation and communicating over the local network.

As shown in FIG. 5, operation 502 relates to receiving an incoming multimedia stream including a plurality of incoming frames. The multimedia stream, in some embodiments, is an IPTV based stream received over a service provider network. In operation, a local STB may request that a service provider network broadcast data that corresponds to a multimedia program. In disclosed embodiments, the data corresponding to the multimedia program is sent as a multimedia stream that is processed to result in a plurality of incoming frames. The incoming frames are for presenting on a display and may be presented at specific refresh rates, for example every 33 milliseconds. As shown, operation 504 relates to buffering a portion of the plurality of incoming frames. For example, video buffer 307A (FIG. 3) may be used to buffer video components of the frames and audio buffer 306A (FIG. 3) may be used to buffer any audio components associated with the frames. In addition, data buffer 308A may be used for storing data associated with the frames that may relate to text for displaying with the frames, for example. In other embodiments, data buffer 308A may store commands or instructions that may be used in processing corresponding frames. In operation 504, each entire frame including its load may be buffered or, alternatively, an index that points to a load stored in another location may be buffered. If operational speed requires it, embodied systems may buffer in operation 504 only the headers of frames to save overhead.

As shown in FIG. 5, in operation 506 methodology 500 relates to receiving a play point from a remote device. The play point may be sent over a local network from another STB, for example. In such cases, the received play point may be referred to as a "remote play point" because it corresponds to the play point of a device that is separate from a local device. However, such remote devices may be in the same physical location as a local device performing methodology 500. The play point received in operation 506 may include a frame number, packet number, or hash value associated with the particular frame a remote STB is processing or presenting to a television for display, for example. In some embodiments, the received play point has associated with it a timestamp for use by a local device in determining a local play point that corresponds to the remote play point. The local STB and remote STB may each access a global clock provided by a service provider network or satellite. In some embodiments, a local device performing methodology 500 may generate a software interrupt in response to a remote device sending a play point. In some systems, any software latencies associated with processing the remote play point may be ignored or estimated when determining a local play point. The play point may correspond to a particular frame that is then being processed by a remote device such as a DVR. In some embodiments, the play point is stored by an RG that is communicatively coupled to the remote device and the local device that are synchronized. The RG may store a table in computer readable media that contains the play point of devices that communicate with the RG. In this way, compatibility to allow direct communication between remote devices and local devices to be synchronized may be less important. In some embodiments, the play point may correspond to a frame within a multimedia stream that contains audio, video, and out-of-band information.

As shown, operation 508 relates to playing an instance of the multimedia program at the play point of the remote device. Playing a local instance of the multimedia program at the play point of the remote device ensures that there is not an echo effect, for example, with the two audio outputs of the remote STB and the local STB. As shown, optional operation 510 includes requesting the play point from the remote device. Operation 510 may be performed as an initial matter when a local STB performing methodology 500 tunes to a multimedia program already being presented by a remote STB. In some embodiments, the remote STB or remote STBs are communicatively coupled by a local network or through a common RG with the local STB. In operation, the local STB may request from the RG or area network an indication of whether other area STBs are tuned to the multimedia program. Accordingly, using methodology 500, the local STB may synchronize its presentation of the multimedia program with the presentations of other instances of the multimedia program by other STBs.

While the disclosed systems may be described in connection with one or more embodiments, it is not intended to limit the subject matter of the claims to the particular forms set forth. On the contrary, it is intended to cover such alternatives, modifications and equivalents as may be included within the spirit and scope of the subject matter as defined by the appended claims. For example, although disclosed embodiments are often described in terms of STBs, it should be noted that disclosed embodiments may incorporate such functionality into data processing systems, displays, televisions, or monitors that do not have physical characteristics, for example, of traditional converter boxes that may have been operated from atop a television.

What is claimed is:

1. A synchronizing set-top box comprising:
   a demultiplexer for:
   receiving a multimedia stream including video stream packets and an audio stream packets for a multimedia program;
   buffering header fields of the audio stream packets to an audio buffer;
   buffering header fields of the video stream packets to a video buffer; and
   buffering load fields of the video stream packets to a load buffer, separate from the video buffer;
   an input for receiving a frame identification value from a remote set top box, wherein the synchronizing set top box and the remote set top box are associated with a common client of a multimedia content provider and are both playing the multimedia program and wherein the frame identification value is indicative of a remote play point frame of the multimedia program on the remote set top box;
   a controller for:
   selecting a local play point frame based on the frame identification value; and
   playing the multimedia program from the local play point frame substantially synchronized with the multimedia program playing on the remote set top box; and
   requesting a remote play point from a residential gateway, wherein the remote play point indicates a play point of the multimedia program playing on the remote set top box, wherein the remote set top box is communicatively coupled to the residential gateway;
   wherein the residential gateway and the remote set top box and the synchronizing set top box are all within a common residence; and
   wherein the frame identification value includes a hash of at least one individual video frame.

2. The set-top box of claim 1 further comprising:
   an output for sending a multicast join request to the multimedia content provider.

3. The set-top box of claim 1 further comprising:
   a frame identification module for identifying the local play point frame.

4. The set-top box of claim 1, wherein the frame identification value is stored on a computer readable medium of the residential gateway communicatively coupled to the remote set top box and to the synchronizing set-top box.

5. The set-top box of claim 1 wherein:
   the frame identification value is included in a header field of a stream packet selected from the video stream packets and the audio stream packets.

6. The set-top box of claim 1 further comprising:
   a system clock accessible to the controller for selecting the local play point frame.

7. The set-top box of claim 6, wherein the header fields of the video stream packets include a timestamp and the controller periodically monitors synchronization between the local play point frame and the remote play point frame based on values of the timestamp.

8. The set-top box of claim 7, wherein the frame identification value includes a sequential identifier for an individual video frame.

9. A non-transitory computer readable medium including processor executable instructions that, when executed by the processor, cause the processor to perform a operations comprising:
   receiving, by a synchronizing set top box, a multimedia stream including video stream packets and an audio stream packets for a multimedia program;
   buffering header fields of the audio stream packets to an audio buffer;
   buffering header fields of the video stream packets to a video buffer;
   buffering a load field of the video stream packets to a load buffer, separate from the video buffer;
   receiving, by the synchronizing set top box, a frame identification value corresponding to a reference play point frame of a multimedia program being rendered by a remote set-top box wherein the synchronizing set top box and the remote set top box are both associated with a common client of a multimedia content provider;
   adjusting a local play point frame based on the reference play point frame;
   rendering, by the synchronizing set top box, the multimedia program, wherein the multimedia program rendered by the synchronizing set top box is substantially synchronized in time with the rendering of the multimedia program by the remote set top box; and
   requesting a remote play point from a residential gateway, wherein the remote play point indicates a play point of the multimedia program playing on the remote set top box, wherein the remote set top box is communicatively coupled to the residential gateway;
   wherein the residential gateway and the remote set top box and the synchronizing set top box are all within a common residence; and
   wherein the frame identification value includes a hash of at least one individual video frame.

10. The computer readable medium of claim 9, wherein the frame identification value is received over a local network.

11. The computer readable medium of claim 9, wherein the frame identification value includes a remotely generated index value from the remote set-top box.

12. The computer readable medium of claim 11, wherein adjusting the local play point frame includes comparing the remotely generated index value to a local index value.

13. The computer readable medium of claim 9, wherein the header field includes:
   an index field for storing a hash of the load field.

14. The computer readable medium of claim 13, wherein the operations include:

comparing the reference play point frame to a local audio play point within the audio buffer; and adjusting a multimedia play point of the multimedia stream based on the comparing.

15. The computer readable medium of claim 14, wherein the frame identification value is derived from an audio input from a microphone.

16. The computer readable medium of claim 15, wherein the microphone is communicatively coupled to a remote control device.

17. The computer readable medium of claim 14, wherein the operations include:

determining an occurrence of an audio event, wherein the audio event corresponds in time to the reference play point frame.

18. The computer readable medium of claim 17, wherein the frame identification value is from an audio signal, and wherein adjusting the local play point includes:

adjusting an audio play point of the multimedia stream; and
adjusting a video play point of the multimedia stream.

19. A method of frame synchronization, the method comprising:

receiving, by a first set top box associated with a client of a multimedia content provider, an incoming multimedia stream corresponding to a multimedia program, the incoming multimedia stream including video stream packets and audio stream packets for a plurality of incoming frames;

buffering header fields of the audio stream packets to an audio buffer;

buffering header fields of the video stream packets to a video buffer;

buffering a load field of the video stream packets to a separate buffer than the video buffer;

requesting a remote play point from a residential gateway, wherein the remote play point indicates a play point of the multimedia program playing on a remote set top box, wherein the remote set top box is communicatively coupled to the residential gateway; and responsive to receiving the remote play point, playing the multimedia program on the first set top box from a play point selected based on the remote play point, wherein the multimedia program playing on the first set top box corresponds in time with the playing of the multimedia program playing on the remote set top box, wherein the remote play point includes a hash of at least one individual video frame of the multimedia program; and wherein the residential gateway, the first set top box, and the remote set top box are all within a common residence.

20. The method of claim 19, wherein requesting the remote play point from the residential gateway includes sending a join request to the multimedia content provider.

21. The method of claim 19, wherein requesting the remote play point and receiving the remote play point occur over a local network.

22. The method of claim 20, further comprising:

wherein the join request is a multicast join request to join a multicast of the incoming multimedia stream.

23. The method of claim 19, wherein buffering a portion of the plurality of incoming frames includes buffering a plurality of pointers that index a corresponding plurality of packet loads.

\* \* \* \* \*